United States Patent
Choi et al.

(10) Patent No.: US 7,838,756 B2
(45) Date of Patent: Nov. 23, 2010

(54) AUDIO PLAYBACK DEVICE HAVING FUNCTION FOR ADJUSTING PLAYBACK SPEED AND A METHOD THEREOF

(75) Inventors: Chul-min Choi, Seongnam-si (KR); Vadim Kudryavtsev, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 528 days.

(21) Appl. No.: 11/867,823

(22) Filed: Oct. 5, 2007

(65) Prior Publication Data

US 2008/0228297 A1 Sep. 18, 2008

(30) Foreign Application Priority Data

Mar. 16, 2007 (KR) .................. 10-2007-0026043

(51) Int. Cl.
*G10H 1/36* (2006.01)
(52) U.S. Cl. .................. 84/610; 84/609; 84/615; 84/622; 84/626; 84/634
(58) Field of Classification Search .................. None
See application file for complete search history.

(56) References Cited

U.S. PATENT DOCUMENTS

| 5,917,917 | A * | 6/1999 | Jenkins et al. ................ 381/63 |
| 5,930,373 | A * | 7/1999 | Shashoua et al. ............. 381/98 |
| 6,590,983 | B1 * | 7/2003 | Kraemer ....................... 381/17 |
| 6,606,388 | B1 * | 8/2003 | Townsend et al. ............. 381/17 |
| 2003/0219137 | A1 * | 11/2003 | Fincham ..................... 381/302 |
| 2009/0245539 | A1 * | 10/2009 | Vaudrey et al. ............. 381/109 |

* cited by examiner

*Primary Examiner*—Marlon T Fletcher
(74) *Attorney, Agent, or Firm*—Jefferson IP Law, LLP

(57) ABSTRACT

An audio playback device having a function for adjusting a playback speed, and a method thereof includes, in the audio playback device, stored audio data is decoded and converted into an audio stream in a PCM format, and the audio stream is divided into a high frequency band and a low frequency band at cut-off frequency. The audio stream of the high frequency band is signal-processed using an overlap add (OLA) algorithm, and the audio stream of the low frequency band is down-sampled and signal-processed using a synchronized overlap and add (SOLA) algorithm. Accordingly, calculation time of the stream processor 130 is minimized so that a TSM function is efficiently implemented.

27 Claims, 7 Drawing Sheets

AUDIO PLAYBACK DEVICE HAVING FUNCTION FOR ADJUSTING PLAYBACK SPEED AND A METHOD THEREOF

CROSS-REFERENCE TO RELATED APPLICATION

This application claims the benefit of Korean Application No. 2007-26043, filed Mar. 16, 2007 in the Korean Intellectual Property Office, the disclosure of which is incorporated herein by reference.

BACKGROUND OF THE INVENTION

1. Field of the Invention

Aspects of the present invention relate to an audio playback device having a function for adjusting a playback speed, and a method thereof. More particularly, aspects of the present invention relate to an audio playback device having a function for adjusting and outputting a playback speed as required by a user, and a method thereof.

2. Description of the Related Art

Usually, audio playback devices such as MP3 players can adjust and output the playback speed of audio according to a user's requirements. For example, if a user uses an MP3 player as a language teaching machine, the user can increase or decrease the playback speed as required. In addition, when exercising or jogging, the tempo of output audio can be adjusted according to the user's jogging pace or exercise rhythm, allowing the MP3 player to be effectively used in such situations.

FIG. 1 is a schematic block diagram illustrating the configuration of a general audio playback device. In FIG. 1, the audio playback device includes a storage unit 10, a decoder 20, a stream processor 30, a playback unit 40, a controller 50, and a manipulation unit 60. The storage unit 10 stores audio data compressed in formats such as a Moving Picture Experts Group (MPEG) format or an audio compression-3 (AC-3) format. The decoder 20 decodes the compression of the audio data stored in the storage unit 10, and converts the audio data into an audio stream of a pulse code modulation (PCM) format (i.e., stream (a)). The stream processor 30 outputs the audio stream of a PCM format (i.e., stream (b)) by modifying an overlapping area of each frame on a time base or by skipping a certain frame of the stream (a). The playback unit 40 converts the audio stream (b) of a PCM format output from the stream processor 30 into an analog audio signal, and amplifies the analog audio signal to a certain volume.

The controller 50 controls the stream processor 30 in accordance with a user command input through the manipulation unit 60 so that the audio stream (a) of a PCM format output from the decoder 20 is output to the audio stream (b) by overlapping or skipping. Consequently, the playback speed of the audio can be adjusted. Moreover, the controller 50 controls the playback unit 40 to adjust the volume of the audio according to a user command.

FIGS. 2A and 2B illustrate methods of adjusting the audio playback speed of a general audio playback device as an example. In FIG. 2A, frames are rearranged on a time base t' by increasing an overlapped area between the frames on an original time base t using a synchronized overlap and add (SOLA) algorithm, so the audio playback speed increases. In FIG. 2B, frames are rearranged on a time base t' by skipping frame 3 among the frames on an original time base t using the SOLA algorithm, so the audio playback speed increases.

FIGS. 3A and 3B illustrate the configuration of the stream processor 30 in a general audio playback device. As shown in FIG. 3A, the stream processor 30 includes a sub-band divider 31, a signal processor 33 and a sub-band integrator 35. The sub-band divider 31 divides an input audio stream into sub-bands. In the signal processor 33, for each audio stream separated into sub-bands, each current frame is stored in each input buffer In Band 1, In Band 2, . . . , and In Band N. Each time scale adjuster TSM 1, TSM 2, . . . , and TSM N calculates a correlation between each sub-band by the controller 50, and the calculated correlation is stored in each output buffer Out Band 1, Out Band 2, . . . , and Out Band N. The sub-band integrator 35 integrates each sub-band stored in each output buffer Out Band 1, Out Band 2, . . . , and Out Band N.

As shown in FIG. 3B, the stream processor 30 includes a phase vocoder (not shown), a fast Fourier transform (FFT) unit 32, a phase processor 34, and an inverse fast Fourier transform (IFFT) unit 36. The FFT unit 32 divides an audio stream into frames, performs FFT for each frame, and converts each frame into a spectrum of a frequency area. The phase processor 34 calculates a phase increase of a spectrum between two frames, accumulates the calculated results in accordance with control of the controller 50, and generates an output spectrum from the input spectrum. The phase processor 34 may have the same configuration as the time scale adjusters TSM 1, TSM 2, . . . , and TSM N as shown in FIG. 3A.

The IFFT unit 36 performs IFFT for the spectrum output from the phase processor 34, and converts the spectrum into an audio stream in a time area.

By using a method of processing an audio stream using the SOLA algorithm as described above, the pitch of the audio stream does not change, so the chord intervals remain unchanged. In addition, the method prevents, when each frame is rearranged a time base t', the location of each frame is discontinuously located, resulting in deteriorating sound quality. However, because the SOLA algorithm uses a method of rearranging an optimum location taking correlation between the two successive frames into consideration, a great deal of calculation time is needed when applying the algorithm to a complex audio stream so that costs for calculations will be raised. Consequently, due to the calculation time, there is difficulty in implementing a real-time time scale modification (TSM) function of an audio playback device.

SUMMARY OF THE INVENTION

Aspects of the present invention provide at least the advantages described below. Accordingly, an aspect of embodiments of the present invention is to provide an audio playback device having a function for adjusting playback speed while minimizing the calculation time, by considering the correlation between successive frames, so that chord intervals are maintained and sound quality does not deteriorate when adjusting the audio playback speed.

According to an aspect of the present invention, there is provided an audio playback device, comprising a stream processor which divides an audio stream into a high frequency band and a low frequency band, separately signal-processes the audio stream in the high frequency band and the low frequency band, and integrates the signal-processed audio stream in the high frequency band and the low frequency band, and a playback unit which converts the audio stream output from the stream processor into an analog audio signal, and amplifies and outputs the analog audio signal.

According to an aspect of the invention, the stream processor may down-sample and signal-process the audio stream of the low frequency band.

According to an aspect of the invention, the stream processor may signal-process the down-sampled audio stream of the low frequency band using a synchronized overlap and add (SOLA) algorithm.

According to an aspect of the invention, the stream processor may signal-process the audio stream of the high frequency band using an overlap add (OLA) algorithm.

According to an aspect of the invention, the stream processor may divide the audio stream into the high frequency band and the low frequency band at a cut-off frequency of 5.3 kHz.

According to an aspect of the invention, the audio playback device may further comprise a controller which controls a time scale of the stream processor according to a user command to adjust an audio playback speed, wherein the controller synchronizes the signal-processing of the audio stream of the high frequency band and the low frequency band.

According to another aspect of the present invention, there is provided a method for adjusting an audio playback speed, comprising dividing an audio stream into a high frequency band and a low frequency band, separately signal-processing the audio stream in the high frequency band and the low frequency band, integrating the signal-processed audio stream in the high frequency band and the low frequency band, and converting the integrated audio stream into an analog audio signal, and amplifying and outputting the analog audio signal.

According to an aspect of the invention, in the signal-processing, the audio stream of the low frequency band may be down-sampled and signal-processed.

According to an aspect of the invention, in the signal-processing, the down-sampled audio stream of the low frequency band may be signal-processed using a synchronized overlap and add (SOLA) algorithm.

According to an aspect of the invention, in the signal-processing, the audio stream of the high frequency band may be signal-processed using an overlap add (OLA) algorithm.

According to an aspect of the invention, in the dividing, the audio stream may be divided into the high frequency band and the low frequency band at a cut-off frequency of 5.3 kHz.

According to an aspect of the invention, the method may further comprises controlling a time scale for processing the audio stream of the high frequency band and the low frequency band according to a user command to adjust an audio playback speed, and synchronizing the signal-processing of the respective audio stream of the high frequency band and the low frequency band.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the embodiments, taken in conjunction with the accompanying drawings of which.

DETAILED DESCRIPTION OF THE EMBODIMENTS

Figure 1:
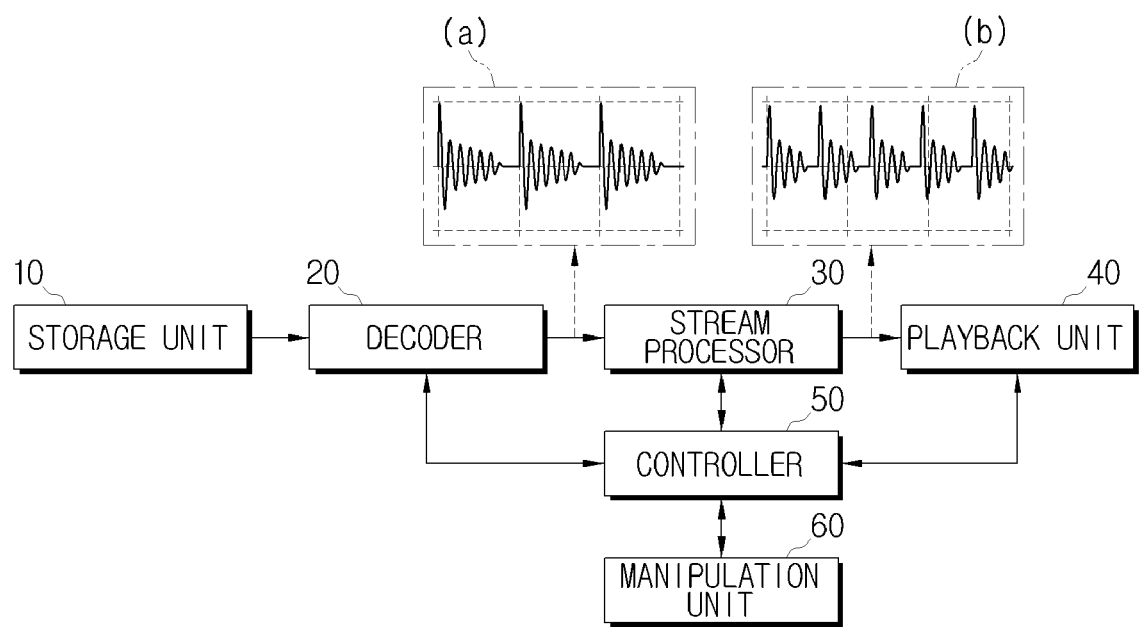
FIG. 1 is a block diagram schematically illustrating the configuration of a general audio playback device.
Figure 2A:
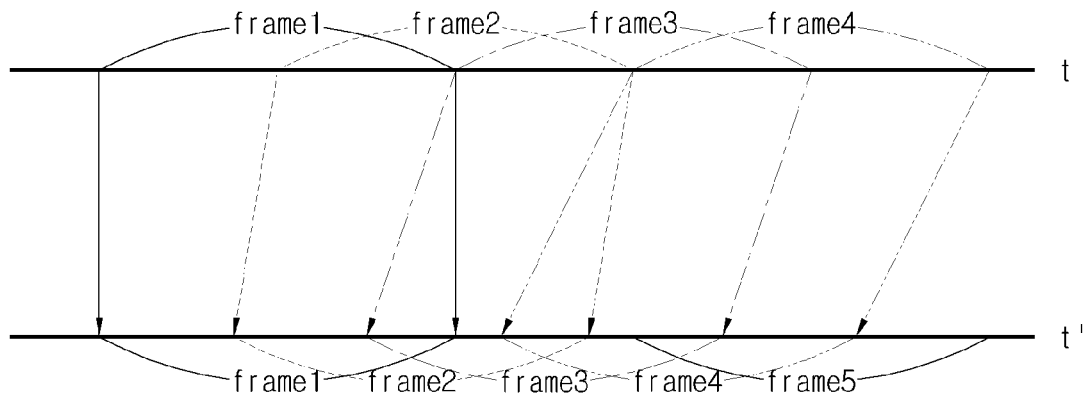
FIGS. 2A and 2B illustrate methods for adjusting an audio playback speed of a general audio playback device.
Figure 2B:
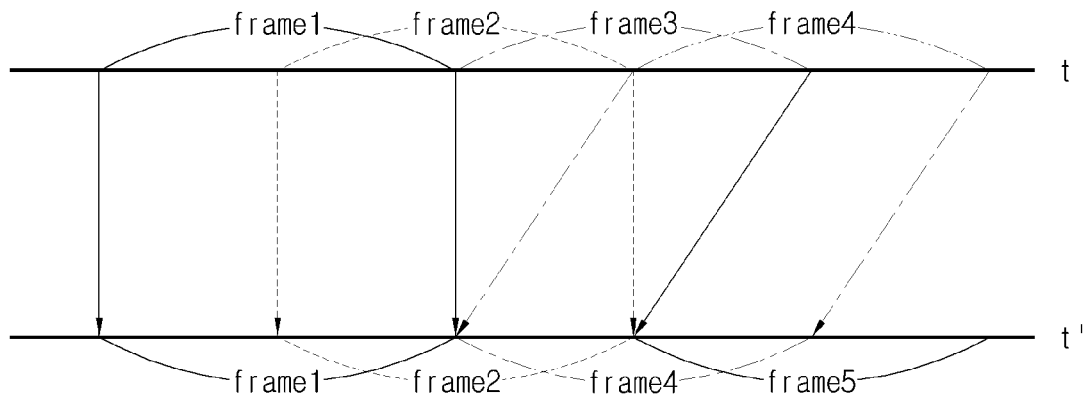
Figure 3A:
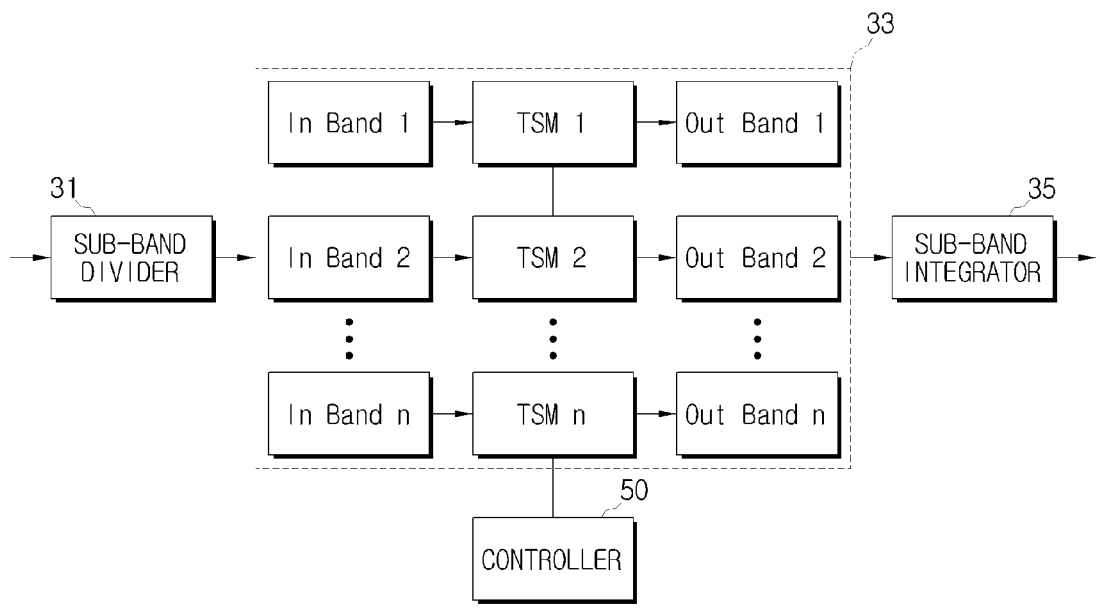
FIGS. 3A and 3B are block diagrams illustrating the configuration of a stream processor of a general audio playback device.
Figure 3B:
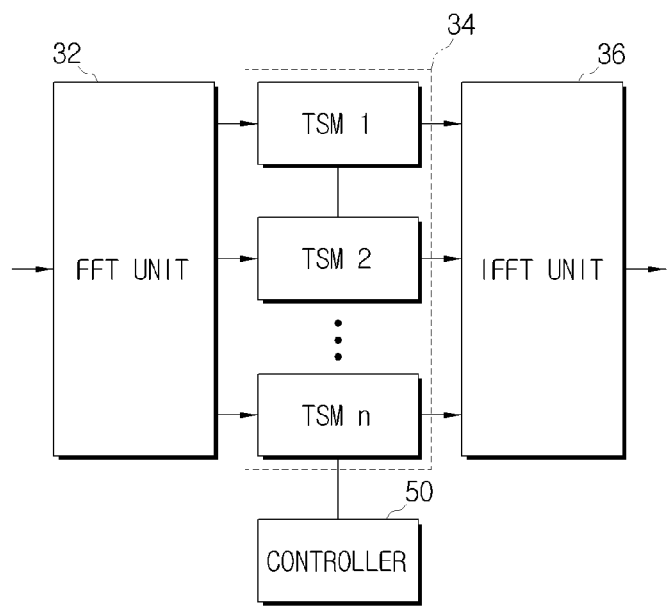

Reference will now be made in detail to the aspects of the present embodiment of the present invention, examples of which are illustrated in the accompanying drawings, wherein like reference numerals refer to the like elements throughout. The embodiments are described below in order to explain the present invention by referring to the figures.

Figure 4:
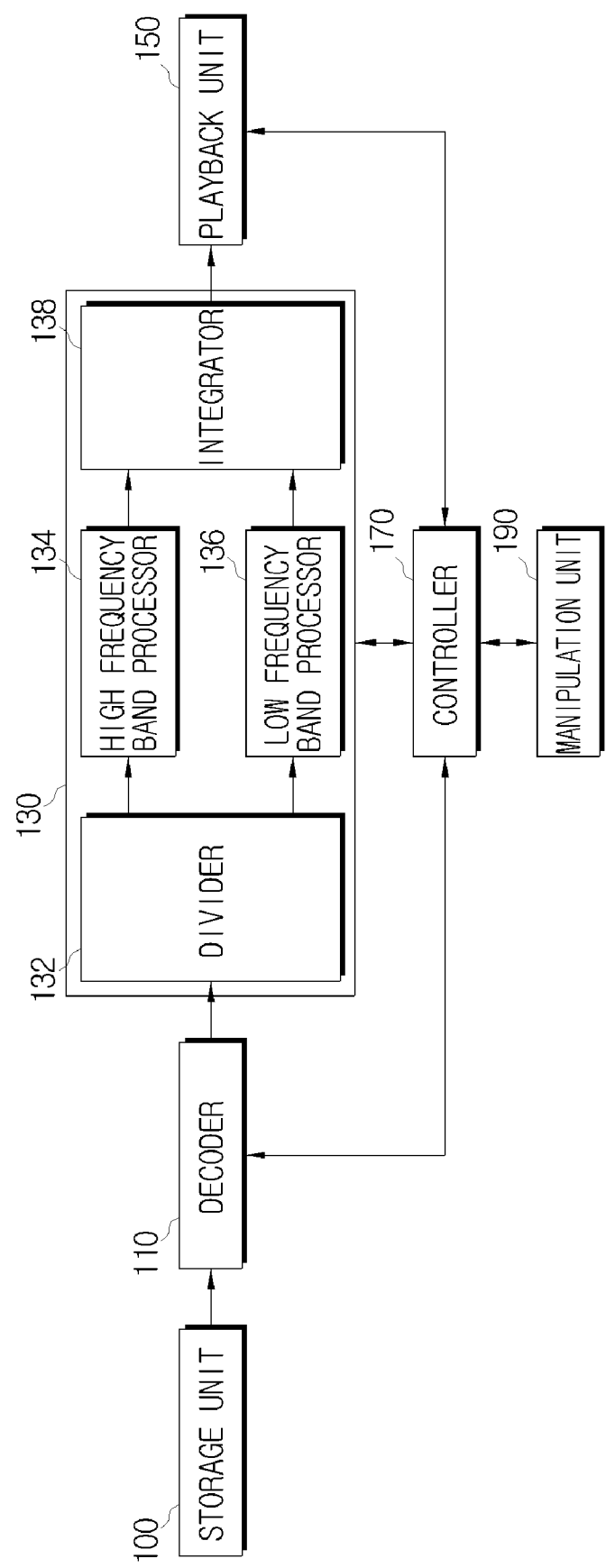
FIG. 4 is a block diagram illustrating the configuration of an audio playback device according to an exemplary embodiment of the present invention.

FIG. 4 is a block diagram illustrating the configuration of an audio playback device according to an exemplary embodiment of the present invention. With reference to FIG. 4, the audio playback device includes a storage unit 100, a decoder 110, a stream processor 130, a playback unit 150, a controller 170, and a manipulation unit 190. While not required in all aspects, the audio playback unit can be included in a portable or non-portable computer, a portable or non-portable media playback device, a cell phone, a personal digital assistant (PDA), or other any like apparatus. Further, the audio playback unit can be included in a device which records audio and/or records and/or reproduces video or image data in addition to or synchronized with the audio data.

The storage unit 100 stores audio data compressed in formats such as a Moving Picture Experts Group (MPEG) format or an audio compression-3 (AC-3) format. However, it is understood that other compression techniques can be used, and that the audio can be uncompressed in other aspects.

The decoder 110 decodes the compression of the audio data stored in the storage unit 10, and converts the audio data into an audio stream of a pulse code modulation (PCM) format. The stream processor 130 divides the audio stream of a PCM format into a high frequency band, and into a low frequency band. The processor 130 performs signal-processing for each frequency band, and outputs an audio stream integrating the high and low frequency bands. The stream processor 130 includes a divider 132, a high frequency band processor 134, a low frequency band processor 136, and an integrator 138.

Figure 5A:
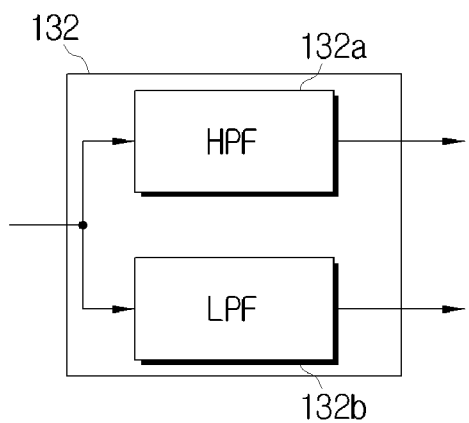
FIG. 5A is a block diagram illustrating the configuration of a divider of an audio playback device according to an exemplary embodiment of the present invention.
Figure 5B:
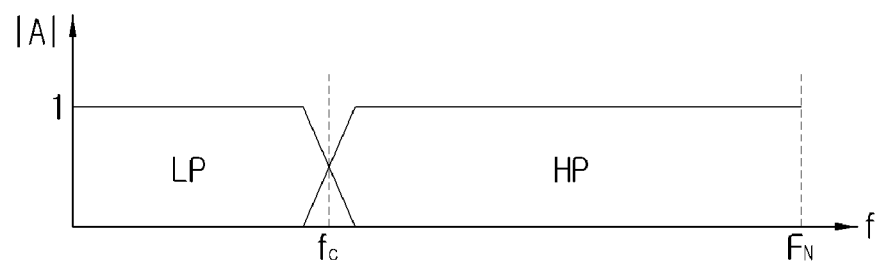
FIG. 5B illustrates a cut-off frequency applied to a divider of an audio playback device according to an exemplary embodiment of the present invention.

The divider 132 divides the audio stream into the high frequency band and the low frequency band at a cut-off frequency $f_c$ as shown in FIG. 5B.

The high frequency band processor 134 performs signal-processing of the high frequency band audio stream using an overlap add (OLA) algorithm. The OLA algorithm is a method for performing simple signal-processing of a high frequency band audio stream by overlapping and adding two frames regardless of a correlation between the frames. By applying the OLA algorithm to a high frequency band audio stream, there is no need to calculate the correlation between two successive frames. Because the human auditory faculty is not sensitive to a high frequency wavelengths, applying the OLA algorithm in a high frequency band does not seriously reduce the sound quality.

The low frequency band processor 136 down-samples a low frequency band audio stream, performs signal-processing using the synchronized overlap and add (SOLA) algorithm taking the correlation between frames into consideration, and up-samples the audio stream. The detailed operation of the low frequency band processor 136 will be described below with reference to FIG. 6.

The integrator 138 integrates the audio stream output from the high frequency band processor 134 and the low frequency band processor 136. The playback unit 150 converts the audio stream of a PCM format output from the stream processor 130 into an analog audio signal, and amplifies the analog audio signal to a certain volume.

The controller 170 controls the stream processor 130 in accordance with a user command input through the manipulation unit 190 so that an audio stream of a PCM format output from the decoder 110 is signal-processed and the audio playback speed is adjusted. That is, the controller 170 adjusts the audio playback speed by controlling the time scales of the high and low frequency band processors 134 and 136 in accordance with a user command to adjust the audio playback speed, and synchronizes the high and low frequency band processors 134 and 136. In addition, the controller 170 controls the playback unit 150 to adjust the volume of the audio according to a user command.

FIG. 5A is a block diagram illustrating the configuration of the divider 132 of an audio playback device shown in FIG. 4 according to an exemplary embodiment of the present invention. As shown in FIG. 5A, the divider 132 includes a high pass filter (HPF) 132A and a low pass filter (LPF) 132B. The HPF 132A passes an audio stream of a frequency band higher than the cut-off frequency $f_c$, and blocks an audio stream of a frequency band lower than the cut-off frequency $f_c$. An audio stream of a high frequency band passing the HPF 132A is input to the high frequency band processors 134, and is signal-processed through the process simpler than an audio stream of a low frequency band.

The LPF 132B blocks an audio stream of a frequency band higher than the cut-off frequency $f_c$, and passes an audio stream of a frequency band lower than the cut-off frequency $f_c$. An audio stream of a low frequency band passing the LPF 132B is input to the high frequency band processors 136.

FIG. 5B illustrates a cut-off frequency applied to the divider 132 according to an exemplary embodiment of the present invention. The cut-off frequency $f_c$ is designed to range from 5.3 kHz to 7 kHz. When the cut-off frequency $f_c$ is 5.3 kHz, the calculation time of the stream processor 130 is minimized. If the cut-off frequency $f_c$ is under 5.3 kHz, the calculation time may be more reduced, but sound distortion due to phase inconsistency between frames may occur. Accordingly, the range of the cut-off frequency $f_c$ adapted to the divider 132 of the audio playback device according to an exemplary embodiment of the present invention is limited to 5.3 kHz to 7 kHz. However, the range can be otherwise adjusted according to a specific implementation, or can be determined according to the audio playback device being used.

Figure 6:
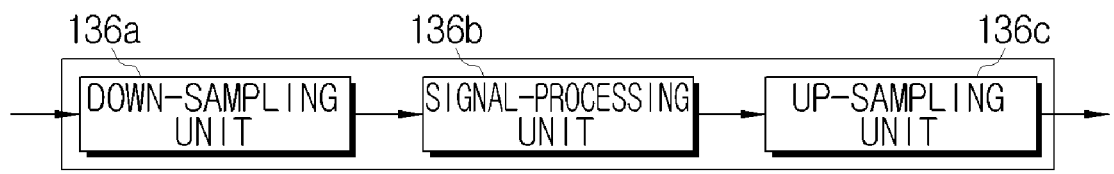
FIG. 6 is a block diagram illustrating the configuration of a low frequency band processor of an audio playback device according to an exemplary embodiment of the present invention.

FIG. 6 is a block diagram illustrating the configuration of the low frequency band processor 136 according to an exemplary embodiment of the present invention. In FIG. 6, the low frequency band processor 136 includes a down-sampling unit 136A, a signal-processing unit 136B, and an up-sampling unit 136C. The down-sampling unit 135A down-samples a frequency of the low-frequency audio stream output from the LPF 132b of the divider 132. The signal-processing unit 136B signal-processes the down-sampled audio stream using the SOLA algorithm. The up-sampling unit 136C up-samples the signal-processed audio stream to an original frequency.

As described above, the low frequency band processor 136 can reduce the calculation time for calculating correlation by down-sampling an audio stream of a low frequency band. For example, it is assumed that an audio stream of 44.1 kHz is input. If the down-sampling unit 135A down-samples 44.1 kHz to ¼, an audio stream of 11.025 kHz is output. The signal processor 136B performs signal-processing by applying a SOLA algorithm to the audio stream of 11.025 kHz so that the calculation time for calculating correlation between frames is reduced to ¼ of those of an audio stream of 44.1 kHz.

Figure 7:
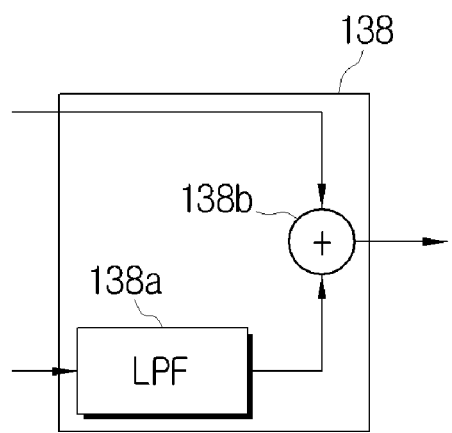
FIG. 7 is a block diagram illustrating the configuration of an integrator of an audio playback device according to an exemplary embodiment of the present invention.

FIG. 7 is a block diagram illustrating the configuration of the integrator 138 of an audio playback device according to an exemplary embodiment of the present invention. As shown in FIG. 7, the integrator 138 includes a LPF 138A and an adder 138B. From among audio streams output from the low frequency band processor 136, the LPF 138A blocks an audio stream of a frequency band higher than the cut-off frequency $f_c$ and passes an audio stream of a frequency band lower than a cut-off frequency $f_c$. The adder 138B output a single audio stream by adding an audio stream of a low frequency band passing the LPF 138A and an audio stream of a high frequency band output from the high frequency band processor 134.

Figure 8:
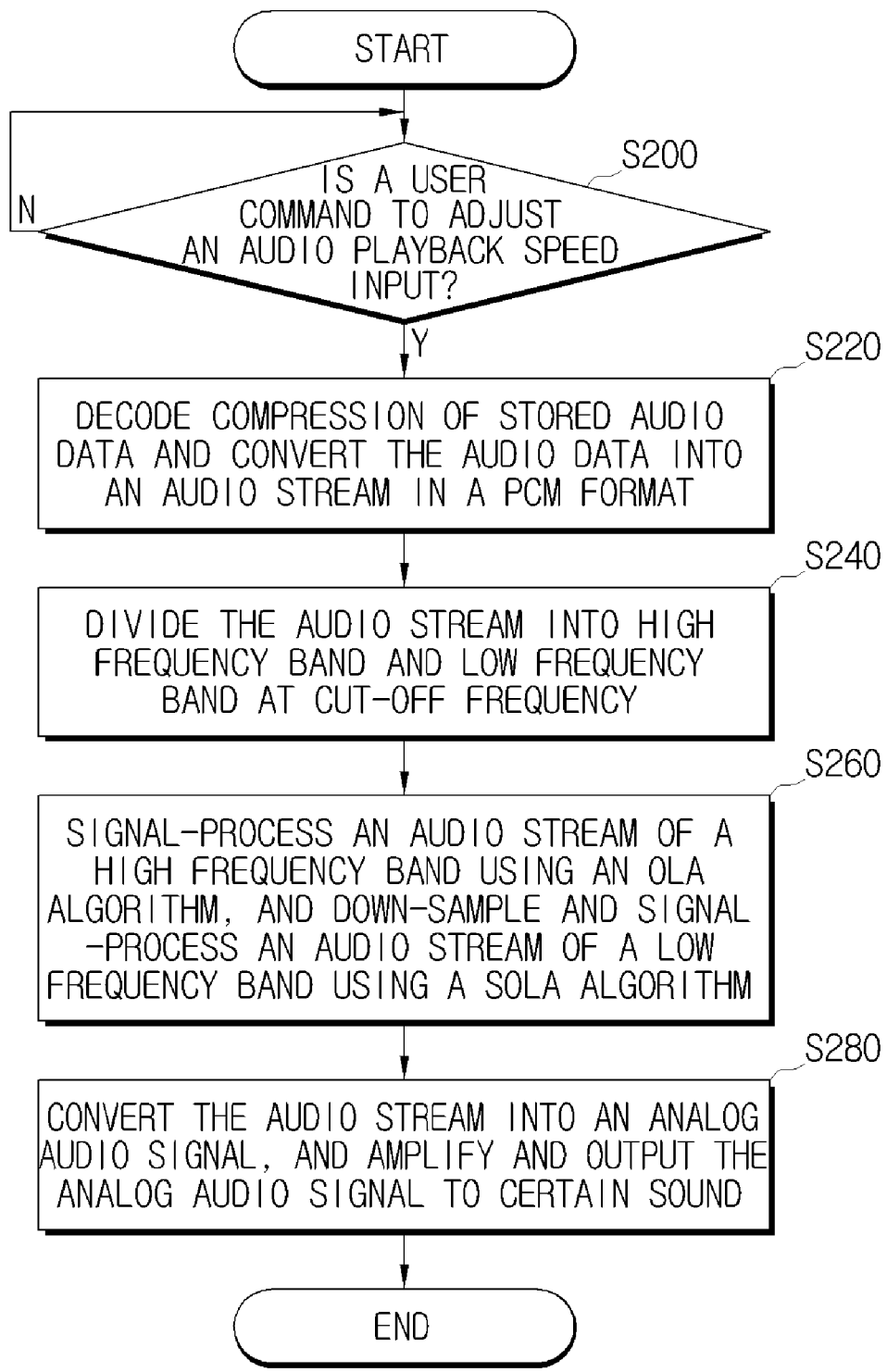
FIG. 8 is a flow chart illustrating the operation of an audio playback device according to an exemplary embodiment of the present invention.

FIG. 8 is a flow chart illustrating the operation of an audio playback device according to an exemplary embodiment of the present invention. With reference to FIG. 8, if a user command to adjust an audio playback speed is input in operation S200, the decoder 110 decodes the compressed audio data stored in the storage unit 100 and converts the audio data into an audio stream in a PCM format in operation S220. While not required, it is understood that the input can be from non-users such as where speed changes are automatically performed.

The divider 132 divides the audio stream output from the decoder 110 into audio streams of a high frequency band and a low frequency band at the cut-off frequency $f_c$ in operation S240.

In operation S260, the high frequency band processor 134 performs signal-processing of an audio stream of a high frequency band using an OLA algorithm, and the low frequency band processor 136 down-samples an audio stream of a low frequency band, and performs signal-processing using a SOLA algorithm. The audio stream of a high frequency and the audio stream of a low frequency band are integrated after the signal processors.

In operation S280, the playback unit 150 converts the audio stream into an analog audio signal, and amplifies and outputs the analog audio signal to a certain volume.

Through the above process, a user can adjust an audio playback speed. If a user does not want to adjust the audio playback speed, the stream processor 130 performs a general signal-processing to play audio of the original speed in operation S200.

As can be appreciated from the above description, an audio stream is divided into a high frequency band and a low frequency band, an audio stream of a low frequency band is down-sampled and signal-processed, and the calculation time for calculating correlation between frames is minimized, so that a real-time TSM function is efficiently implemented and audio in which chord intervals are maintained sound quality is not reduced can be provided to a user.

While not required in all aspects, aspects of the invention can be implemented as computer software and/or firmware encoded on media readable by one or more computers and/or processors. Further, while described as using the OLA and SOLA algorithms, it is understood that other types of algorithms and/or other types of OLA algorithms can be used in addition to or instead of the OLA and SOLA algorithms, and that additional processors can be used to define other frequency bands in addition to or instead of the high and low frequency bands described in the example shown in FIG. 5A.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An audio playback device, comprising:
a manipulation unit which receives a command to adjust an audio playback speed from a user;
a decoder which, if the command to adjust the audio playback speed is input, decompresses audio data and converts the audio data into an audio stream;
a stream processor which divides the audio stream into a high frequency band and a low frequency band, separately signal-processes the audio stream in the high frequency band and the low frequency band to produce a signal-processed-high-frequency audio stream using a first processing method and a separate signal-processed-low-frequency audio stream using a second processing method other than the first method, and integrates the signal-processed high and low frequency audio streams into an integrated signal-processed audio stream; and
a playback unit which converts the integrated signal-processed audio stream output from the stream processor into an analog audio signal, and amplifies and outputs the analog audio signal.

2. The audio playback device of claim 1, wherein the stream processor down-samples and signal-processes the audio stream of the low frequency band.

3. The audio playback device of claim 2, wherein the stream processor signal-processes the down-sampled audio stream of the low frequency band using a synchronized overlap and add (SOLA) algorithm to produce the signal-processed-low-frequency audio stream.

4. The audio playback device of claim 1, wherein the stream processor signal-processes the audio stream of the high frequency band using an overlap add (OLA) algorithm to produce the signal-processed-high-frequency audio stream.

5. The audio playback device of claim 1, wherein the stream processor divides the audio stream into the high frequency band and the low frequency band at a cut-off frequency of 5.3 kHz.

6. The audio playback device of claim 1, further comprising a controller which controls a time scale of the stream processor according to a user command to adjust an audio playback speed, and synchronizes the signal-processing of the audio stream of the high frequency band and the low frequency band.

7. A method for adjusting an audio playback speed, comprising:
receiving a command to adjust an audio playback speed from a user;
when the command to adjust the audio playback speed is input, decompressing audio data and converting the audio data into an audio stream;
dividing the audio stream into a high frequency band and a low frequency band;
separately signal-processing the audio stream in the high frequency band using a first signal process to produce a signal-processed-high-frequency audio stream and signal-processing the audio stream in the low frequency band using a second signal process other than the first signal process to produce a separate signal-processed-low-frequency audio stream;
integrating the signal-processed high and low frequency audio streams to produce an integrated processed audio stream;
converting the integrated processed audio stream into an analog audio signal; and
amplifying and outputting the analog audio signal.

8. The method of claim 7, wherein the separately signal-processing comprises down-sampling the audio stream of the low frequency band and signal processing the down-sampled audio stream of the low frequency.

9. The method of claim 8, wherein separately signal processing the down-sampled audio stream of the low frequency comprises using a synchronized overlap and add (SOLA) algorithm to signal process the down-sampled audio stream of the low frequency band.

10. The method of claim 7, wherein the separately signal-processing comprises using an overlap add (OLA) algorithm to signal process the audio stream of the high frequency band.

11. The method of claim 7, wherein the dividing comprises dividing the audio stream into the high frequency band and the low frequency band at a cut-off frequency of 5.3 kHz.

12. The method of claim 7, further comprising:
controlling a time scale for processing the audio stream of the high frequency band and the low frequency band according to a user command to adjust an audio playback speed; and
synchronizing the signal-processing of the respective audio stream of the high frequency band and the low frequency band.

13. A recording and/or reproducing apparatus, comprising:
a manipulation unit which receives a command to adjust an audio playback speed from a user;
a decoder which, if the command to adjust the audio playback speed is input, decompresses audio data and converts the audio data into an audio stream;
a stream processor which divides the audio stream into a first frequency band and a second frequency band relative to a predetermined cut-off frequency, performs a first signal process on a first portion of the audio stream within the first frequency band, performs a second signal process other than the first signal process on a second portion of the audio stream within the second frequency band, and integrates the signal-processed first and second portions of the audio streams into an integrated signal-processed audio stream; and
a playback unit which decodes and outputs the integrated signal-processed audio stream output from the stream processor.

14. The apparatus of claim 13, wherein:
the first signal process uses one of an overlap add (OLA) algorithm and a synchronized overlap add (SOLA) algorithm, and
the second signal process uses the other one of the OLA algorithm and the SOLA algorithm.

15. The apparatus of claim 13, further comprising a controller which controls the stream processor to signal process the audio stream to adjust an audio playback speed of the audio stream when reproduced by the playback unit.

16. The apparatus of claim 15, wherein:
the stream processor further comprises
a first processor which performs the first signal process on the first portion, and
a second processor which performs the second signal process on the second portion, and
the controller, to control the stream processor to signal process the audio stream to adjust the audio playback speed, individually controls time scales of the first and second processors, and synchronizes the first and second processors.

17. The apparatus of claim 16, wherein the cut off frequency is in a range from 5.3 kHz to 7 kHz.

18. The apparatus of claim 17, wherein the second frequency band is at or less than the cut off frequency, and the first frequency band is above the cut off frequency.

19. The apparatus of claim 18, wherein:
the first signal process uses an overlap add (OLA) algorithm, and
the second signal process uses a synchronized overlap and add (SOLA) algorithm.

20. A stream processor for use in a recording and/or reproducing apparatus, the stream processor comprising:
a manipulation unit which receives a command to adjust an audio playback speed from a user;
a decoder which, if the command to adjust the audio playback speed is input, decompresses audio data and converts the audio data into an audio stream;
a divider which divides the audio stream into a first portion within a first frequency band and a second portion within a second frequency band relative to a predetermined cut-off frequency;
a first processor which performs a first signal process on the first portion of the audio stream within the first frequency band;
a second processor which performs a second signal process on the second portion of the audio stream within the second frequency band;
an integrator which integrates the signal-processed first and second portions of the audio streams into an integrated signal-processed audio stream; and
a controller to control the first and second processors to signal process the audio stream to adjust an audio playback speed of the audio stream.

21. The stream processor of claim 20, wherein:
the first signal process uses one of an overlap add (OLA) algorithm and a synchronized overlap and add (SOLA) algorithm, and
the second signal process uses the other one of the OLA algorithm and the SOLA algorithm.

22. The stream processor of claim 20, wherein the controller, to adjust the audio playback speed, individually controls time scales of the first and second processors, and synchronizes the first and second processors.

23. The stream processor of claim 20, wherein the cut off frequency is in a range from 5.3 kHz to 7 kHz.

24. The stream processor of claim 23, wherein the second frequency band is at or less than the cut off frequency, and the first frequency band is above the cut off frequency.

25. The stream processor of claim 24, wherein:
the first signal process uses an overlap add (OLA) algorithm, and
the second signal process uses a synchronized overlap and add (SOLA) algorithm.

26. A method for adjusting an audio playback speed, comprising:
receiving a command to adjust an audio playback speed from a user;
when the command to adjust the audio playback speed is received, decompressing audio data and converting the audio data into an audio stream;
performing a first signal process on a first portion of the audio stream within a first frequency band relative to a predetermined cut-off frequency to accelerate a playback speed of the first portion;
performing a second signal process on a second portion of the audio stream within a second frequency band other than the first frequency band to accelerate a playback speed of the second portion, the second signal process being other than the first signal process; and
integrating the signal-processed first and second portions of the audio stream into an integrated signal-processed audio stream having a synchronized accelerated playback speed.

27. The method of claim 26, wherein:
the first signal process uses an overlap add (OLA) algorithm, and
the second signal process uses a synchronized overlap and add (SOLA) algorithm.

* * * * *